(12) United States Patent
Kaylor

(10) Patent No.: US 7,407,558 B2
(45) Date of Patent: Aug. 5, 2008

(54) FIBER BATT HAVING A SEPARATOR LAYER

(75) Inventor: Philip S. Kaylor, Claremont, NC (US)

(73) Assignee: L&P Property Management Company, South Gate, CA (US)

( * ) Notice: Subject to any disclaimer, the term of this patent is extended or adjusted under 35 U.S.C. 154(b) by 210 days.

(21) Appl. No.: 11/202,841

(22) Filed: Aug. 12, 2005

(65) Prior Publication Data

US 2007/0037463 A1 Feb. 15, 2007

(51) Int. Cl.
*B32B 7/00* (2006.01)

(52) U.S. Cl. .................. 156/247; 156/249; 428/105; 428/107; 428/109; 428/113; 428/40.1; 442/35

(58) Field of Classification Search .................. None
See application file for complete search history.

(56) References Cited

U.S. PATENT DOCUMENTS

| | | | |
|---|---|---|---|
| 2,580,202 A * | 12/1951 | Talalay et al. ............ 442/35 |
| 2,777,779 A | 1/1957 | Harwood et al. |
| 2,791,268 A | 5/1957 | Mendelson |
| 2,943,010 A | 6/1960 | Stefl et al. |
| 3,616,124 A * | 10/1971 | Danhel et al. ............ 428/174 |
| 3,616,142 A | 10/1971 | Schrotenboer |
| 4,076,886 A | 2/1978 | Corcoran |
| 4,183,985 A * | 1/1980 | Lemieux ................... 428/91 |
| 4,824,498 A | 4/1989 | Goodwin et al. |
| 4,859,512 A | 8/1989 | Jones et al. |
| 4,921,752 A | 5/1990 | Eschenbach |
| 5,047,276 A | 9/1991 | Chomarat et al. |
| 5,116,439 A | 5/1992 | Raus |
| 5,139,841 A | 8/1992 | Makoui et al. |
| 5,326,612 A * | 7/1994 | Goulait ..................... 428/100 |
| 5,470,648 A | 11/1995 | Pearlman et al. |
| 5,585,161 A | 12/1996 | Difloe et al. |
| 5,614,285 A | 3/1997 | Gardill |
| 5,691,036 A | 11/1997 | Lin et al. |
| 5,733,822 A | 3/1998 | Gessner et al. |
| 5,756,187 A * | 5/1998 | Kuo et al. ............... 428/195.1 |
| 6,121,166 A | 9/2000 | Wood et al. |
| 6,129,964 A * | 10/2000 | Seth ........................ 428/40.1 |
| 6,344,254 B1 | 2/2002 | Smith et al. |
| 6,425,637 B1 | 7/2002 | Peterson |
| 6,503,855 B1 | 1/2003 | Menzies et al. |
| 6,528,437 B1 | 3/2003 | Hepfinger et al. |
| 6,558,786 B1 | 5/2003 | Jupina |
| 7,238,633 B1 * | 7/2007 | Kaylor ..................... 442/381 |
| 2002/0160682 A1 | 10/2002 | Zeng et al. |

* cited by examiner

*Primary Examiner*—Philip C Tucker
*Assistant Examiner*—Kimberly K McClelland
(74) *Attorney, Agent, or Firm*—Conley Rose, P.C.; Kristin Jordan Harkins

(57) ABSTRACT

A nonwoven fiber product comprising a first nonwoven fiber batt, a second nonwoven fiber batt, and a separator layer attached to each of the first fiber batt and the second fiber batt, the separator layer physically separating the first fiber batt and the second fiber batt, wherein upon application of a tensile force to the nonwoven fiber product, the first fiber batt remains attached to the separator layer and the second fiber batt separates from the separator layer. An article of furniture may incorporate the nonwoven fiber product, and/or a method for manufacturing an article of furniture may utilize the nonwoven fiber product. The nonwoven fiber product may also be utilized on an article of furniture require two different thicknesses of cushioning material.

17 Claims, 6 Drawing Sheets

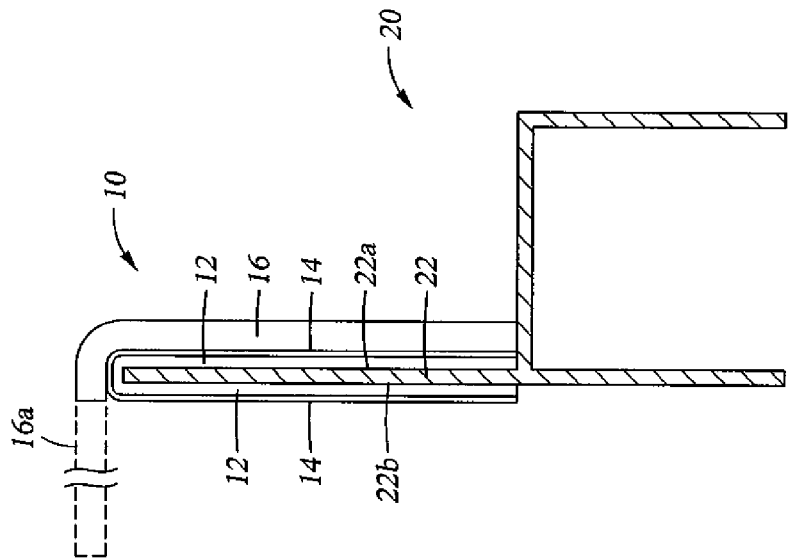
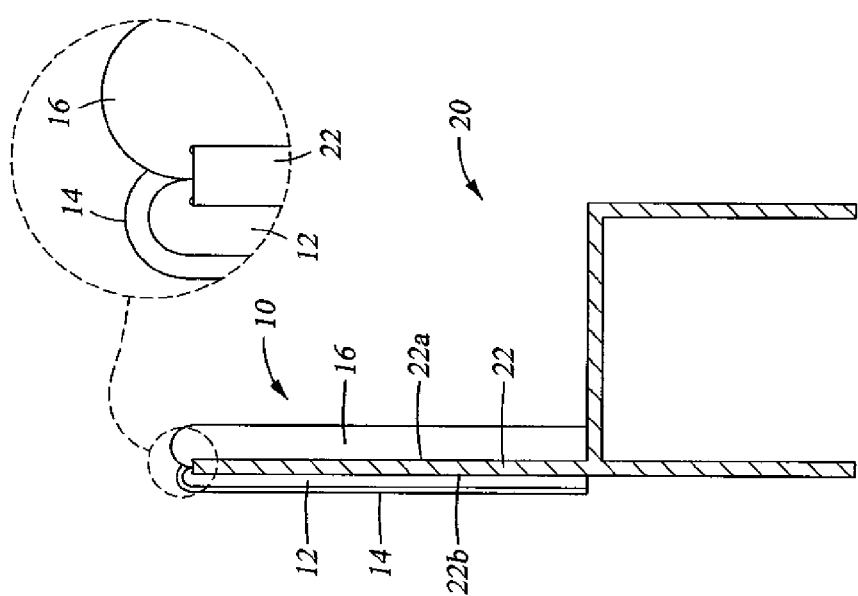
Fig. 3A
Fig. 3B

FIBER BATT HAVING A SEPARATOR LAYER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Furniture is manufactured by attaching cushioning materials to a frame and covering the cushioning materials with upholstery. More specifically, furniture manufacturers make an article of furniture by assembling a frame typically from wood, covering the frame with cushioning material such as nonwoven fiber batts or polymeric foam, and upholstering the cushioned frame with a decorative fabric. When manufacturing an article of furniture, furniture manufacturers need cushioning material of various weights per unit surface area (weights) and thicknesses because not all parts of an article of furniture have the same amount of cushioning. In order to obtain cushioning material of various weights and thicknesses, furniture manufacturers sometimes separate thicker cushioning material into a plurality of thinner cushioning materials by pulling the cushioning materials apart. However, many cushioning materials do not separate with a substantially uniform weight and substantially planar surface when a tensile force is applied across the thickness of the cushioning material. The cushioning material has to have a substantially uniform weight and planar surface so that the cushioning material provides a consistent level of support, does not create surface irregularities or feel non-uniform. To achieve a substantially uniform weight and planar surface, the cushioning material has to be cut with a hot wire or saw. The use of a hot wire or saw within the furniture manufacturing facility is not preferred because it increases the capital investment in and operating costs of the facility.

Due to the complexity associated with separating cushioning materials at the manufacturing facility, furniture manufacturers stock cushioning materials of various weights and thicknesses. However, stocking cushioning materials of various weights and thicknesses consumes a large amount of space in the manufacturing facility. Furniture manufacturers would have more room for furniture manufacturing operations if a cushioning material existed that could be easily separated by hand into two pieces, each having a substantially uniform weight and planar surface. Because no such cushioning material currently exists, a need exists for a cushioning material that can be separated by hand into a plurality of cushioning pieces, each with substantially uniform weight and planar surface.

Another problem that furniture manufacturers encounter is that the various surfaces of an article of furniture require cushioning materials having different thicknesses. For example, the inside of a chair back is more heavily cushioned than the outside of a chair back. The difference in cushioning is the result of the application of thicker cushioning material to the inside of the chair back compared with the outside of the chair back. Currently, no single piece of cushioning material can be applied to both the inside of the chair back and the outside of the chair back to achieve the required level of cushioning on each surface. If a cushioning material existed that could be separated into two cushioning materials of differing thicknesses, then the manufacturing facility could separate the cushioning material into the two separate pieces of cushioning material and apply each piece to different portions of the article of furniture, such as the inside and the outside of a chair back. Alternatively, the cushioning material could remain unseparated and applied to portions of the article of furniture that require even greater cushioning, such as the chair seat. If it existed, such a cushioning material would reduce the time and complexity of the manufacturing process, thereby allowing a furniture manufacturer to produce an article of furniture quicker, easier, and at a reduced cost. Therefore, a need exists for a cushioning material that can be separated into a plurality of pieces of cushioning material of various thicknesses, such that the pieces of cushioning material can be applied to various portions of an article of furniture requiring different thicknesses, thereby allowing a single cushioning material to be able to upholster an article of furniture where currently multiple pieces of cushioning material are required.

Yet another problem encountered at furniture manufacturing facilities is that relatively thin areas of the cushioning material may be punctured before the article of furniture is upholstered. For example, when a relatively thin high-loft nonwoven fiber batt, such as a one-half-inch thick high-loft nonwoven fiber batt, is attached between the span separating two pieces of the wood frame, the relatively thin fiber batt may be accidentally punctured by fingers, tools, machinery, and any other objects moving around within the manufacturing facility. The puncture in the cushioning material creates a flaw in the feel of the article of furniture once upholstered. Although thicker cushioning materials are not as susceptible to the puncturing problem, thicker cushioning materials are not practical for some parts of an article of furniture, such as a chair back or the outside of an armrest. Moreover, none of the existing cushioning materials contain a puncture resistant exterior layer. Consequently, a need exists for a cushioning material that contains a layer of material with sufficient strength to prevent accidental puncture of the cushioning material by objects such as fingers, tools, and machinery.

SUMMARY

In one aspect, the invention comprises a nonwoven fiber product comprising a first nonwoven fiber batt, a second nonwoven fiber batt, and a separator layer attached to each of the first fiber batt and the second fiber batt, the separator layer physically separating the first fiber batt and the second fiber batt, wherein upon application of a tensile force to the nonwoven fiber product, the first fiber batt remains attached to the separator layer and the second fiber batt separates from the separator layer. In an embodiment the first fiber batt is attached to the separator layer with a first strength and the separator layer is attached to the second fiber batt with a second strength, the second strength being less than the first strength so that the second fiber batt consistently separates from the first fiber batt and the separator layer. Variously, the first fiber batt, the separator layer, and the second fiber batt are attached together without an adhesive, the separator layer is stronger than the first fiber batt, and/or subsequent to separation of the second fiber batt from the separation layer, the second fiber batt has a substantially planar surface and a substantially uniform weight, and the combination of the separator layer and the first fiber batt has a substantially planar surface and a substantially uniform weight. In embodiments the thickness of the first fiber batt is less than the thickness of the second fiber batt, the separator layer is a nonwoven fiber scrim, and/or the first fiber batt and the second fiber batt are high-loft nonwoven fiber batts.

In another aspect, the invention is an article of furniture comprising a frame comprising a first area and a second area, a nonwoven fiber product configured for attachment to the frame, the nonwoven fiber product comprising a first nonwoven fiber batt, a second nonwoven fiber batt, and a separator layer attached to each of the first fiber batt and the second fiber batt, the separator layer physically separating the first fiber batt and the second fiber batt, wherein at least part of the fiber product is configured for separation into a first portion comprising the first fiber batt and the separator layer, and a second portion comprising the second fiber batt, and wherein after separation of the first portion from the second portion, the first portion is attached to the first area and the second portion is attached to the second area. In embodiments the first portion has a substantially uniform weight and a substantially planar surface, and the second portion has a substantially uniform weight and a substantially planar surface and/or the first fiber batt is attached to the separator layer with a first strength and the separator layer is attached to the second fiber batt with a second strength, the second strength being less than the first strength so that the second fiber batt consistently separates from the first fiber batt and the separator layer. Variously the thickness of the first portion is less than the thickness of the second portion and/or the first fiber batt and the second fiber batt are high-loft nonwoven fiber batts.

In a third aspect, the invention is a method for manufacturing an article of furniture, the method comprising constructing a frame comprising a first area and a second area, the first area requiring a different thickness of cushioning material than the second area, attaching a nonwoven fiber product to the frame, the nonwoven fiber product comprising a first nonwoven fiber batt, a second nonwoven fiber batt, and a separator layer attached to each of the first fiber batt and the second fiber batt, the separator layer physically separating the first fiber batt and the second fiber batt, and separating the fiber product into a first portion comprised of the first fiber batt and the separator layer, and a second portion comprised of the second fiber batt. In and embodiment, the invention further comprises attaching the first portion to the first area, separating the second portion from the first portion, and attaching the second portion to the second area. Variously, the second portion is separated from the first portion without detaching the first portion from the first area, the first fiber batt and the second fiber batt are high-loft nonwoven fiber batts, and/or the first fiber batt is attached to the separator layer with a first strength and the separator layer is attached to the second fiber batt with a second strength, the second strength being less than the first strength so that the second fiber batt consistently separates from the first fiber batt and the separator layer.

In a fourth aspect, the invention is a method for upholstering an article of furniture having a frame, the method comprising attaching a nonwoven fiber product to the frame, the nonwoven fiber product comprising a first nonwoven fiber batt, a second nonwoven fiber batt, and a separator layer attached to each of the first fiber batt and the second fiber batt, the separator layer physically separating the first fiber batt and the second fiber batt, separating the fiber product into a first portion and a second portion being thicker than the first portion, attaching the first portion to the first area, and attaching the second, thicker portion to the second area. In an embodiment, the invention further comprises attaching the first portion to the first area, separating the second portion from the first portion, and attaching the second portion to the second area. Variously, the second portion is separated from the first portion without detaching the first portion from the first area, and/or the invention further comprises attaching the first fiber batt to the separator layer with a first strength and attaching the separator layer to the second fiber batt with a second strength, the second strength being less than the first strength so that the second fiber batt consistently separates from the first fiber batt and the separator layer.

BRIEF DESCRIPTION OF THE DRAWINGS

For a more complete understanding of the present invention, and for further details and advantages thereof, reference is now made to the accompanying drawings, in which:

FIG. 3A is a side view of an article of furniture incorporating an embodiment of the Fiber Batt Having a Separator Layer;

FIG. 3B is a side view of an article of furniture incorporating an alternative embodiment of the Fiber Batt Having a Separator Layer;

DETAILED DESCRIPTION

Figure 1:
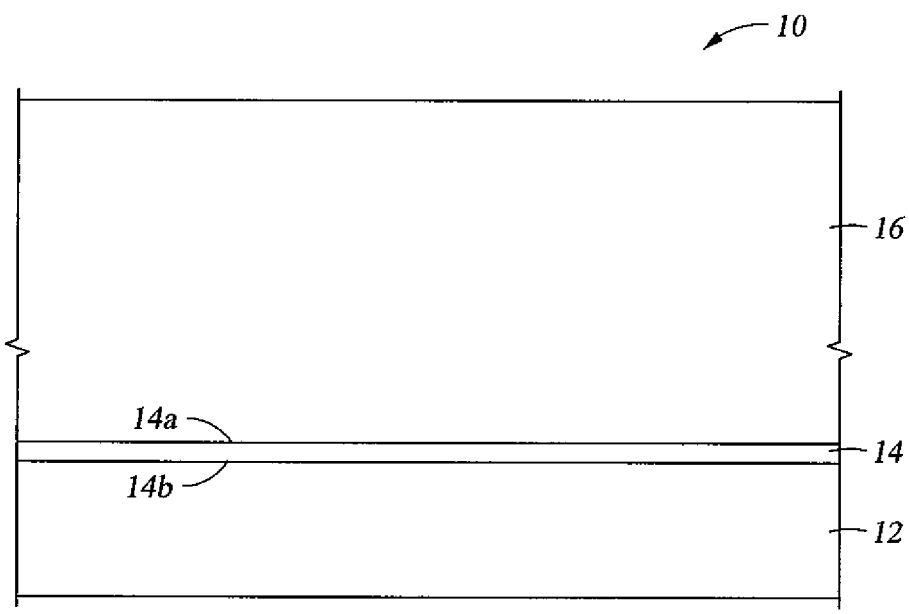
FIG. 1 is a side view of an embodiment of the Fiber Batt Having a Separator Layer.

The Fiber Batt Having a Separator Layer will now be described in greater detail. As seen in FIG. 1, one embodiment of the Fiber Batt Having a Separator Layer 10 is a nonwoven fiber product comprising a first fiber batt 12, a separator layer 14, and a second fiber batt 16. The first fiber batt 12 and the second fiber batt 16 are preferably high-loft nonwoven fiber batts. The separator layer 14 is preferably a nonwoven fiber scrim that substantially separates the first fiber batt 12 from the second fiber batt 14. The first fiber batt 12 is attached to a lower surface 14b of the separator layer 14, while the second fiber batt 16 is attached to an upper surface 14a of the separator layer 14.

The first fiber batt 12 and the second fiber batt 14 are preferably nonwoven fiber batts comprising a homogeneous blend of binder fibers and carrier fibers. The binder fibers and the carrier fibers can be either natural or synthetic. For example, thermoplastic polymer fibers such as polyester or polypropylene are suitable synthetic carrier fibers. Wool, cotton, and silk are examples of suitable natural carrier fibers. Other fibers can be used depending upon the precise processing limitations imposed and the characteristics of the batt which are desired at the end of the process. For purposes of illustrating the process and first fiber batt 12 and the second fiber batt 14 of the Fiber Batt Having a Separator Layer 10 and not by way of limitation, the carrier fiber may be a KoSa Type 209, 6 to 15 denier, 2 to 3 inches in length, round hollow cross section polyester fiber. Alternatively, the carrier fiber may be a KoSa Type 295, 6 to 15 denier, ⅕ to 4 inches in length, pentalobal cross section polyester fiber. Other types of fibers are suitable as carrier fibers for the present invention and are within the scope of this invention.

The binder fiber has a relatively low predetermined melting temperature as compared with the carrier fiber. As used herein, however, the term melting does not necessarily refer only to the actual transformation of the solid polyester binder fibers into liquid form. Rather, it includes a gradual transformation of the fibers or, in the case of a bicomponent sheath/core fiber, the sheath of the fiber, over a range of temperatures within which the sheath becomes sufficiently soft and tacky to cling to other fibers within which it comes in contact, including other binder fibers having its same characteristics and, as described above, adjacent carrier fibers having a higher melting temperature. It is an inherent characteristic of thermoplastic fibers such as polyester that they become sticky and tacky when melted, as that term is used herein. For purposes of illustrating the process and Fiber Batt Having a Separator Layer 10 and not by way of limitation, the binder fiber may be a KoSa Type 254 Celbond® which is a bicomponent fiber with a polyester core and a copolyester sheath. The sheath component melting temperature is approximately 230°F. (110°C.). The binder fiber, alternatively, can be a polyester copolymer rather than a bicomponent fiber.

While the homogeneous mixture of carrier fibers and binder fibers can be any of a number of suitable fiber blends, for purposes of illustrating the process and first blend, the mixture is comprised of binder finders in an amount sufficient for binding the fibers of the blend together upon application of heat at the appropriate temperature to melt the binder fibers. In one example, the binder fibers are in the range of about 5 percent to about 100 percent by total volume of the blend. Preferably, the binder finders are present in the range of about 10 percent to about 15 percent for a high-loft batt and in the range of about 15 percent to about 40 percent for a densified batt, as those characteristics are discussed below. The carrier fibers in the remaining blend volume ranges anywhere from about 0 percent to about 95 percent. Preferably, the carrier finders are present in the range of about 85 percent to about 90 percent for a high-loft batt and in the range of about 60 percent to about 85 percent for a densified batt, as those characteristics are discussed below. Blends having other percentages of binder fibers and carrier fibers are also within the scope of the invention.

In one embodiment of the Fiber Batt Having a Separator Layer 10, the weight, density, and thickness of the first fiber batt 12 and the second fiber batt 16 are determined by, among other factors, the process of compressing the batt during cooling, as discussed below. The ratio of batt density to batt thickness generally dictates whether the Fiber Batt Having a Separator Layer 10 is a high loft batt or a densified batt. For purposes herein, a densified batt has a weight (in ounces per square foot of surface area) greater than the thickness (in inches). Thus, a densified fiber batt generally has a density greater than about 0.75 pounds per cubic foot (pcf). Conversely, a fiber batt having a weight (in ounces per square foot of surface area) less than the thickness (in inches) and/or a density less than about 0.75 pounds pcf are defined herein as high loft batts. High-loft batts also generally have at least about 90 percent air by volume and a thickness of at least 3 millimeters.

The separator layer 14 maintains substantial separation between the first fiber batt 12 and the second fiber batt 16. The separator layer 14 may be formed of any material suitable for the purpose of maintaining substantial separation between the first fiber batt 12 and the second fiber batt 16, including woven fiber products, nonwoven fiber products, foam products, polymeric film products, wood, metal, and polymeric products formed by molding, extrusion, or other methods. Preferably, the separator layer 14 is a nonwoven fiber scrim formed from a combination of the carrier and binder fibers described herein. Alternatively, the separator layer 14 can comprise a plurality of the aforementioned carrier fibers carded together into a nonwoven web and bonded with a resin that is cured by heating the nonwoven web in an oven. Further in the alternative, the separator layer 14 can be a woven scrim.

Figure 2:
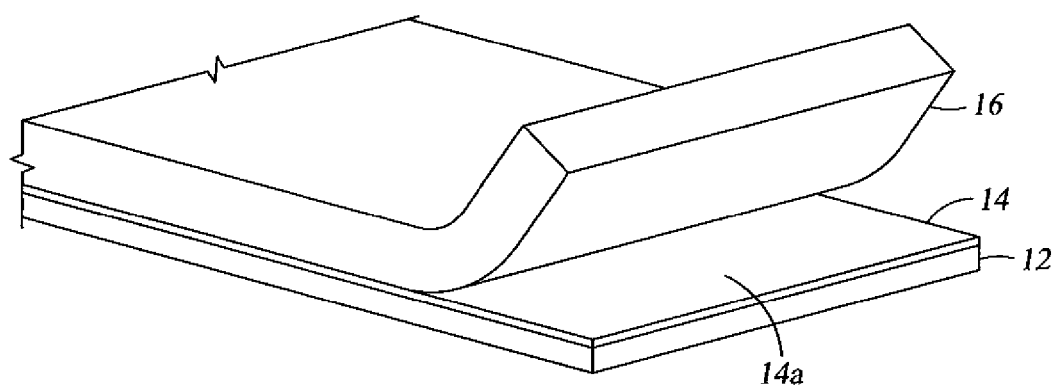
FIG. 2 is a perspective view of an embodiment of the Fiber Batt Having a Separator Layer.

As seen in FIG. 2, when a first tensile force is applied across the thickness of the Fiber Batt Having a Separator Layer 10, the second fiber batt 16 separates from the separator layer 14 and the first fiber batt 12. In the past, when a tensile force was applied across the thickness of a conventional single fiber batt, the fiber batt separated along unpredictable paths to yield two batts with non-planar surfaces, non-uniform weights, and inconsistent thicknesses. In contrast, when the first tensile force is applied across the thickness of the Fiber Batt Having a Separator Layer 10, the Fiber Batt Having a Separator Layer 10 separates at the boundary between the separator layer upper side 14a and the second fiber batt 16, yielding two nonwoven fiber products with non-planar surfaces, non-uniform weights, and inconsistent thicknesses. The separator layer 14 remains attached to the first fiber batt 12 because the attachment force between the first fiber batt 12 and the separator layer 14 is greater than the attachment force between the separator layer 14 and the second fiber batt 16. The difference in the attachment forces between the layers may be the result of a variation in the mechanical bonding steps, such as using different needles used during the needle bonding step described below, may be the result of a different amount of binder fibers or resin used in the first fiber batt 12 and the second fiber batt 16, or may be the result of other processing methods not specifically described herein but included within the scope of the Fiber Batt Having a Separator Layer 10.

In an alternative embodiment, the Fiber Batt Having a Separator Layer 10 may be separated into three nonwoven fiber products, each having a substantially planar surface, substantially uniform weight, and a consistent thickness. If the second fiber batt 16 is completely separated from the separator layer 14 and the first fiber batt 12, the separator layer 14 may then be separated from the first fiber batt 12 to yield the three nonwoven fiber products. In order to separate the separator layer 14 from the first fiber batt 12, a second tensile force is applied across the thickness of the separator layer 14 and the first fiber batt 12, similar to the previously described method by which a separate tensile force separated the second fiber batt 16 from the separator layer 14. Upon application of the second tensile force, the separator layer 14 and the first fiber batt 12 separate into two nonwoven fiber products of substantially planar surface, substantially uniform weight, and consistent thickness. Thus, the herein described separating action can be used to yield up to three nonwoven fiber products of substantially planar surface and substantially uniform weight: the first fiber batt 12, the separator layer 14, and the second fiber batt 16, even though they may have different thicknesses.

As seen in FIGS. 3A and 3B, the Fiber Batt Having a Separator Layer 10 is particularly useful in furniture manufacturing operations when various weights and thicknesses of cushioning material are needed on a single article of furniture. Of course, the relative thicknesses of materials shown in FIGS. 3A and 3B have to been exaggerated to show the details of the invention and are not to scale. In the embodiment illustrated in FIG. 3A, a chair 20 with a chair back 22 utilizes the Fiber Batt Having a Separator Layer 10. The chair back 22 comprises a front side 22a and a back side 22b, the front side 22a requiring more cushioning material than the back side 22b. To apply the Fiber Batt Having a Separator Layer 10 to both the front side 22a and the back side 22b, the second fiber batt 16 is attached to the front side 22a using, for example, glue or another suitable adhesive. After the second fiber batt 16 has been attached to the front side 22a, the separator layer 14, and the first fiber batt 12 are separated from the second fiber batt 16. The separator layer 14 and first fiber batt 12 are then wrapped over the top of the chair back 22 and secured to the back side 22b using glue or other adhesives, staples, nails, tacks, or other fasteners, or other attachment methods, means, and mechanisms not specifically described herein but included within the scope of the Fiber Batt Having a Separator Layer 10.

As shown in the detail section of FIG. 3A, when the Fiber Batt Having a Separator Layer 10 is wrapped over the top of the chair back 22, the Fiber Batt Having a Separator Layer 10 forms a slight V-shape where the second fiber batt 16 meets the separator layer 14 and the first fiber batt 12 at the top of the chair back 22. Depending on the relative thickness of the first fiber batt 12 and the second fiber batt 16 and how the Fiber Batt Having a Separator Layer 10 is oriented when the first fiber batt 12 and separator layer 14 are wrapped over the top of the chair back 22, the V-shape may be oriented upwards, forwards, or backwards. Regardless of the particular orientation of the V-shape, the V-shape may be reduced or substantially eliminated using a plurality of staples, nails, tacks, or other fasteners, or other attachment methods, means, and mechanisms not specifically described herein but included within the scope of the Fiber Batt Having a Separator Layer 10. It is customary within the furniture manufacturing to apply a plurality of the aforementioned attachment methods, means, and mechanisms to the areas where reduced cushioning is desired, such as the top and edges of the chair back 22. Application of the aforementioned attachment methods, means, and mechanisms to the V-shape of the Fiber Batt Having a Separator Layer 10 substantially eliminates sharp discontinuities in the Fiber Batt Having a Separator Layer 10, substantially prevents the second fiber batt 16 from completely separating from the separator layer 14 and the first fiber batt 12, and substantially eliminates any hollow regions between the chair back 22 and the second fiber batt 16 or first fiber batt 12, thereby assuring complete contact between the chair back 22 and the second fiber batt 16 and between the chair back 22 and the first fiber batt 12. It is also customary within the furniture manufacturing industry to apply a plurality of the aforementioned attachment methods, means, and mechanisms to these same areas when applying upholstery to an article of furniture. Of course, persons of ordinary skill in the art will appreciate that the aforementioned attachment methods, means, and mechanisms may be applied to any portion of the Fiber Batt Having a Separator Layer 10 that contacts the chair back 22.

In the embodiment illustrated in FIG. 3B, the Fiber Batt Having a Separator Layer 10 is installed on the chair back 22 using an alternative method. The front side 22a of the chair back 22 requires more cushioning material than the back side 22b of the chair back 22. To apply cushioning material to both the front side 22a and the back side 22b using a single piece of cushioning material, the first fiber batt 12, which is still attached to the separator layer 14 and the second fiber batt 16, is first attached to the front side 22a using glue or other adhesives, staples, nails, tacks, or other fasteners, or other attachment methods, means, and mechanisms not specifically described herein but included within the scope of the Fiber Batt Having a Separator Layer 10. After the first fiber batt 12 has been attached to the front side 22a, the second fiber batt 16 is separated from the separator layer 14 and the first fiber batt 12. The first fiber batt 12 and the separator layer 14 are then folded over the top of the chair back 22 and attached to the back side 22b using one of the aforementioned attachment methods, means, or mechanisms. The remainder of the second fiber batt 16a may then be cut and removed from the chair back 22, or may alternatively be folded back (not shown in FIG. 3B) onto the second fiber batt 16 attached to the front side 22a, thereby further cushioning the front side 22a. The Fiber Batt Having a Separator Layer 10 on the top edge of the chair back 22 may then be secured according to the previously described attachment method.

Regardless of the particular attachment method selected, a further advantage of the Fiber Batt Having a Separator Layer 10 is that the separator layer 14 is attached to the outside of the relatively thin first fiber batt 12 on the back side 22b. The separator layer 14 is stronger than the first fiber batt 12, and therefore protects the relatively thin first fiber batt 12 from penetration by fingers, tools, and machinery that may accidentally come into contact with the first fiber batt 12. The variation in strength between the separator layer 14 and the first fiber batt 12 may be due to a variation in fiber types or relative percentages between the separator layer 14 and the first fiber batt 12, additional mechanical bonding applications to the separator layer 14, the tightness of the weave if the separator layer 14 is a woven product, greater mechanical and/or structural integrity, or a combination of these factors. The increased strength of the separator layer 14 is particularly advantageous in cases where the first fiber batt 12 spans an area of the back side 22b that does not contain a rigid backing, such as the area between two vertical or horizontal members (not shown in FIGS. 3A and 3B) of the frame of the chair 20.

Figure 4:
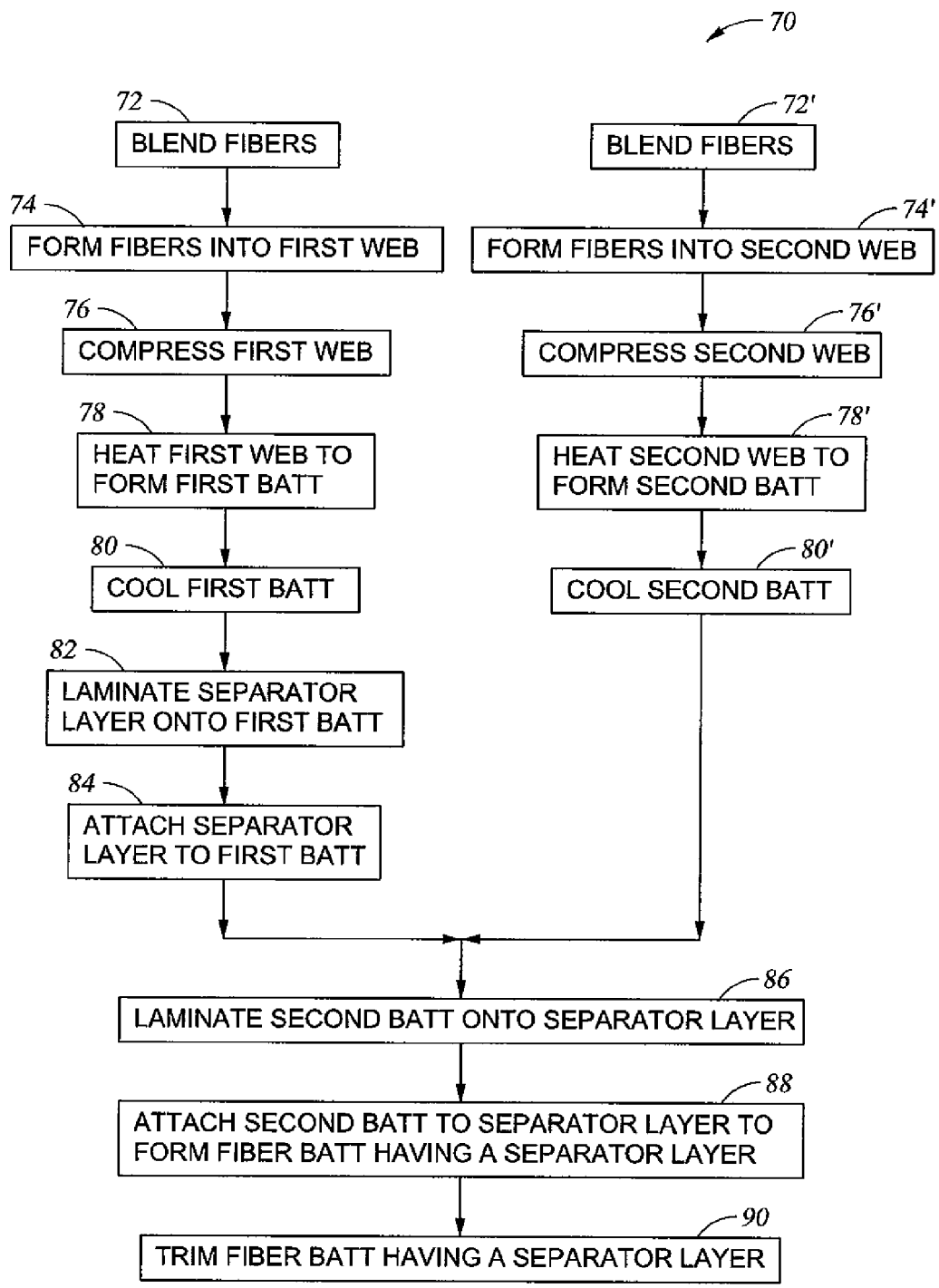
FIG. 4 is a block diagram of one method for manufacturing the fiber batt embodiment of the Fiber Batt Having a Separator Layer.

One method for making the Fiber Batt Having a Separator Layer 10 will now be described in greater detail. As seen in FIG. 4, method 70 for making the Fiber Batt Having a Separator Layer 10 generally comprises forming two nonwoven fiber batts by: blending the fibers at 72, 72', forming the fibers into webs at 74, 74', compressing the webs at 76, 76', heating the webs to form batts at 78, 78', and cooling the batts at 80, 80'. Alternatively, 72, 74, 76, 78, and 80 may be performed prior to or subsequent to 72', 74', 76', 78', and 80'. In an embodiment, 72, 74, 76, 78, and 80 form the first batt 12 and 72', 74', 76', 78', and 80' form the second batt 16, the first batt 12 and the second batt 16 having different thicknesses. The method 70 for making the Fiber Batt Having a Separator Layer 10 further comprises: laminating the separator layer onto the first fiber batt at 82, attaching the separator layer to the first fiber batt at 84, laminating the second fiber batt onto the separator layer at 86, attaching the second fiber batt to the separator layer at 88 to form the Fiber Batt Having a Separator Layer 10, and trimming the Fiber Batt Having a Separator Layer 10 at 90. As will be described in further detail below, one feature of the method 70 is that one of the fiber batts has a stronger attachment force to the separator layer than the other fiber batt. The method 70 will now be described in greater detail.

Figure 5:
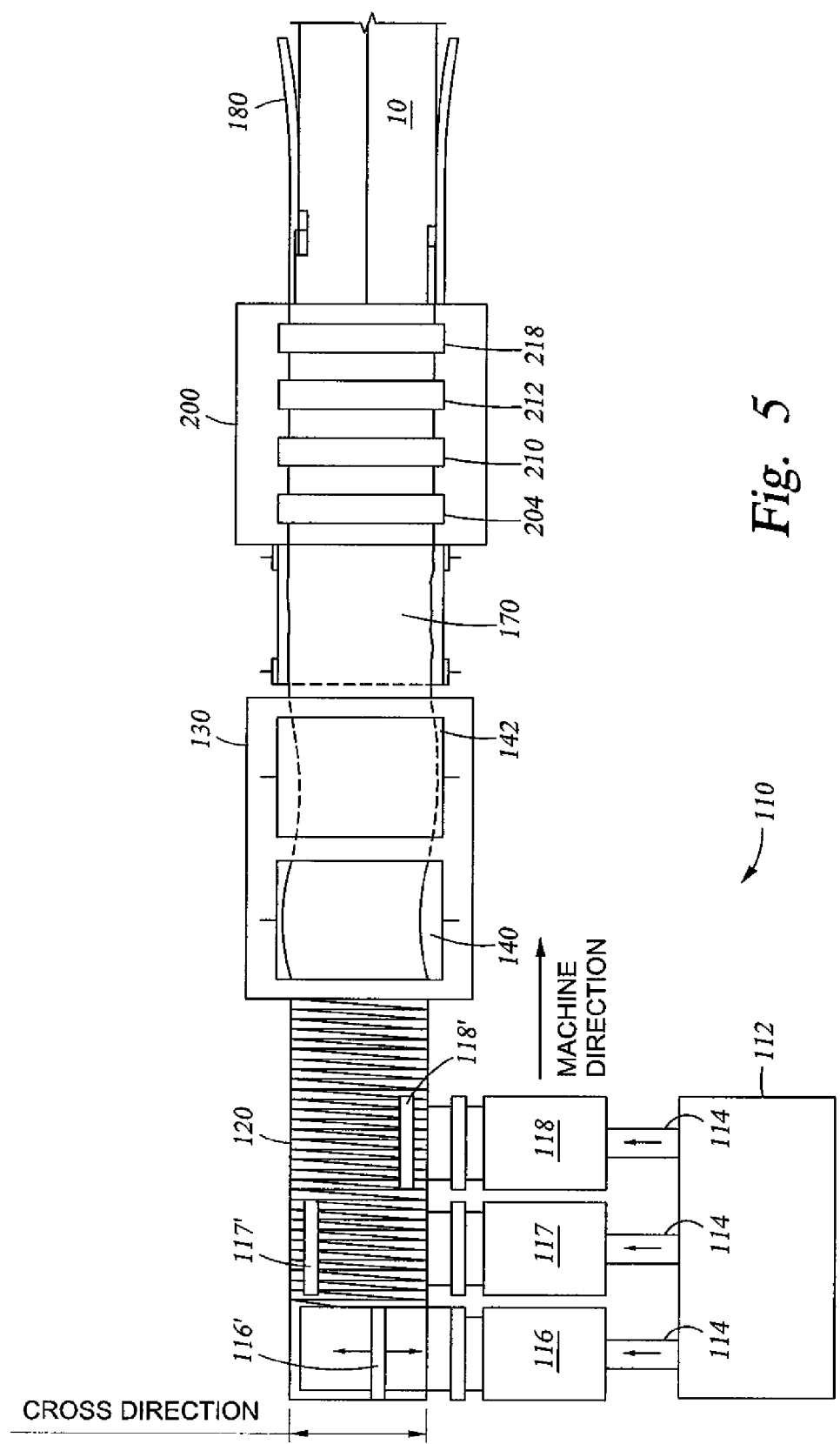
FIG. 5 is a plan view of an embodiment of an apparatus for manufacturing the Fiber Batt Having a Separator Layer in accordance with the method of FIG. 4.

Referring now to FIG. 5, a schematic top plan view of a processing line 110 for constructing the Fiber Batt Having a Separator Layer 10 in accordance with the teachings of the present invention will now be described in greater detail. As may now be seen, the carrier fibers and binder fibers are blended together per 72, 72' of method 70 in a fiber blender 112 and conveyed by conveyor pipes 114 to a web-forming machine or, in this example, three machines 116, 117, and 118. The fibers are preferably a blend of carrier fibers, such as polyester, and binder fibers, such as sheath-core bicomponent fibers, but may be a blend of any binder fibers and any carrier fibers. A suitable web-forming machine is a Garnett machine. An air laying machine, known in the trade as a Rando webber, or any other suitable apparatus can also be used to form a web structure. Garnett machines 116, 117, and 118 card the blended fibers into a web per 74, 74' of method 70 and deliver the web to cross-lappers 116', 117', and 118' to cross-lap the web onto a slat conveyor 120 which is moving in the machine direction. Cross-lappers 116', 117', and 118' reciprocate back and forth in the cross direction from one side of conveyor 120 to the other side to form the web having multiple thicknesses in a progressive overlapping relationship. The number of layers that make up the web is determined by the speed of the conveyor 120 in relation to the speed at which successive layers of the web are layered on top of each other and the number of cross-lappers 116', 117', and 118'. Thus, the number of single layers which make up the web can be increased by slowing the relative speed of the conveyor 120 in relation to the speed at which cross layers are layered, by increasing the number of cross-lappers 116', 117', and 118', or both. Conversely, a fewer number of single layers can be achieved by increasing the relative speed of conveyor 120 to the speed of laying the cross layers, by decreasing the number of cross-lappers 116', 117', and 118', or both. In the present invention, the number of single layers which make up the web of fibers vary depending on the desired characteristics of the Fiber Batt Having a Separator Layer 10 of the present invention. As a result, the relative speed of the conveyor 120 to the speed at which cross layers are layered and the number of cross-lappers 116', 117', and 118' for forming the web may vary accordingly.

The conveyor 120 then transports the web to housing 130 for mechanical and/or vacuum compression per 76, 76' of method 70 and heating per 78, 78' of method 70. While there are a variety of thermal bonding methods which are suitable for the purposes contemplated herein, one such method the application of vacuum pressure through perforations (not shown) in first and second counter rotating drums 140 and 142 positioned in a central portion of the housing 130. The first and second counter rotating drums 140 and 142 heat the web to the extent necessary to melt the binder fibers in the web. For example, heating the web to a temperature of 225-275°F. for a period of three to five minutes is suitable for the purposes contemplated herein. Alternatively, the web may instead move through an oven by substantially parallel perforated or mesh wire aprons that mechanically compress the batt and simultaneously melt the binder fibers.

As the web exits the housing 130, the web is compressed and cooled per 80, 80' of method 70 using a pair of substantially parallel wire mesh aprons 170, only one of which is visible in FIG. 5. The aprons 170 are mounted for parallel movement relative to each other to facilitate adjustment for a wide range of web thicknesses. The web can be cooled slowly through exposure to ambient temperature air or, in the alternative, ambient temperature air can be forced through the perforations of one apron 170, through the web and through the perforations of the other apron 172 from FIG. 6A to cool the web and set it in its compressed state. The web is maintained in its compressed form upon cooling since the solidification of the binder fibers bonds the fibers together in that state.

Figure 6A:
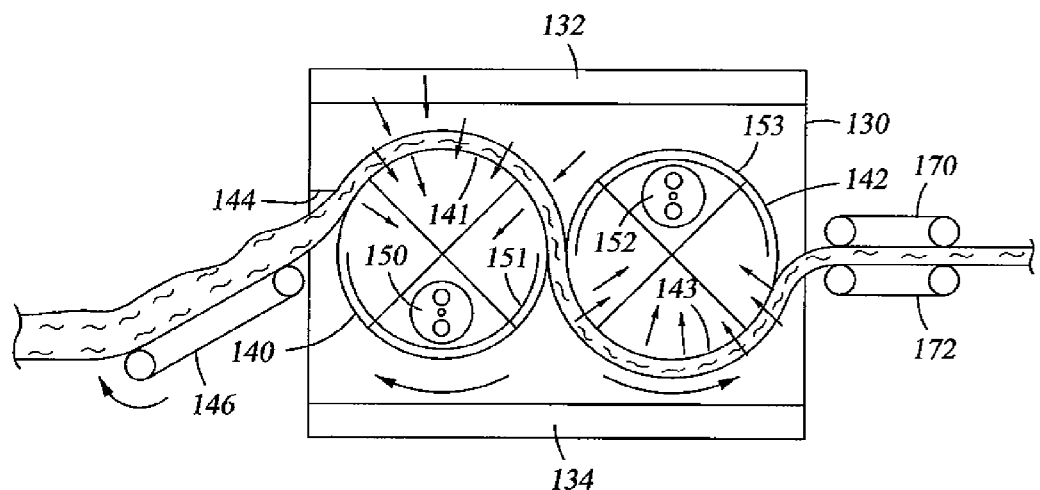
FIG. 6A is a side view of an embodiment of a thermal bonding apparatus used in forming the Fiber Batt Having a Separator Layer in accordance with the method of FIG. 4.

While there are a variety of thermal bonding methods which are suitable for the present invention, one such method, illustrated in FIG. 6A, comprises holding the web by vacuum pressure applied through perforations of first and second counter-rotating drums and heating the web so that the binder fibers in the batt melt to the extent necessary to fuse together the fibers in the web. Alternatively, the web moves through an oven by substantially parallel perforated or mesh wire aprons to melt the binder fibers.

As may be seen in FIG. 6A, the aforementioned vacuum pressure method may be implemented using counter-rotating drums 140, 142 having perforations 141, 143, respectively, which are positioned in a central portion of a housing 130. The housing 130 also comprises an air circulation chamber 132 and a furnace 134 in an upper portion and a lower portion, respectively, thereof. The drum 140 is positioned adjacent an inlet 144 though which the web is fed. The web is delivered from the blending and web-forming processes described herein by means of an infeed apron 146. A suction fan 150 is positioned in communication with the interior of the drum 140. The lower portion of the circumference of the drum 140 is shielded by a baffle 151 positioned inside the drum 140 such that the suction-creating air flow is forced to enter the drum 140 through the perforations 141, which are proximate the upper portion of the drum 140, as the drum 140 rotates.

The drum 142 is downstream from the drum 140 in the housing 130. The drums 140, 142 can be mounted for lateral sliding movement relative to one another to facilitate adjustment for a wide range of batt thicknesses (not shown). The drum 142 includes a suction fan 152 that is positioned in communication with the interior of the drum 142. The upper portion of the circumference of the drum 142 is shielded by a baffle 153 positioned inside the drum 142 so that the suction-creating air flow is forced to enter the drum 142 through the perforations 143, which are proximate the lower portion of drum 142, as the drum 142 rotates.

The nonwoven web is held in vacuum pressure as it moves from the upper portion of the rotating drum 140 to the lower portion of the counter rotating drum 142. The furnace 134 heats the air in the housing 130 as it flows from the perforations 141, 143 to the interior of the drums 140, 142, respectively, to melt the binder fibers in the web to the extent necessary to bind together the fibers in the web.

Figure 6B:
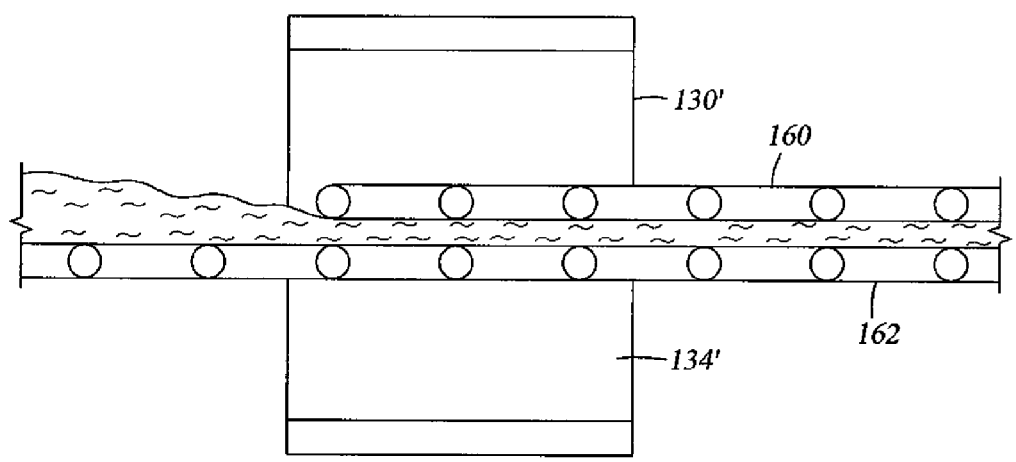
FIG. 6B is a side view of an alternative embodiment of a thermal bonding apparatus used in forming the Fiber Batt Having a Separator Layer in accordance with the method of FIG. 4.

Referring to FIG. 6B, in an alternative thermal bonding process, the web enters housing 130' by a pair of substantially parallel perforated or mesh wire aprons 160, 162. The housing 130' comprises an oven 134' that heats the web to melt the binder fibers to the extent necessary to bind the fibers in the web together.

Collectively referring back to FIGS. 4, 5, 6A and 6B, the web is compressed and cooled per 80, 80' of method 70 as it exits from the housing 130 or 130' by a pair of substantially parallel first and second perforated or wire mesh aprons 170 and 172 or 160 and 162. The aprons 170 and 172 or 160 and 162 are mounted for parallel movement relative to each other to facilitate adjustment for a wide range of web thicknesses (not shown). The web can be cooled slowly through exposure to ambient temperature air or, alternatively, ambient temperature air can be forced through the perforations of one apron, through the web and through the perforations of the other apron to cool the web and set it in its compressed state. The web is maintained in its compressed form upon cooling since the binder fibers bonds the fibers together in the compressed state. After completion of bonding, compression and cooling, the cooled web is referred to as a batt.

In the embodiment of the general processing line 110 illustrated in FIG. 5, the aforementioned sections of the general processing line 110 are used to manufacture a single nonwoven fiber batt, such as first fiber batt 12 shown in FIGS. 1-3. It will be well recognized that components 112, 114, 116, 117, 118, 116', 117', 118', 120, 130, 140, 142, and 170 of the general processing line 110 may be used to subsequently produce the first fiber batt 12 and the second fiber batt 16 and/or the separator layer 14 illustrated in FIGS. 1-3. If the first fiber batt 12, the second fiber batt 16 have the same specifications, including the ratio of carrier fibers to binder fibers, thickness, and weight, then the general processing line 110 may be used to produce both the first fiber batt 12 and the second fiber batt 16 without modifying any of the equipment in the general processing line 110. However, if the specifications of the first fiber batt 12 differ from the specifications of the second fiber batt 16, then the components of the general processing line 110 will have to be modified after production of one batt so that the other batt may be produced with different specifications. Alternatively, components 112, 114, 116, 117, 118, 116', 117', 118', 120, 130, 140, 142, and 170 from two separate general processing lines 110 may be utilized so that the first fiber batt 12 and the second fiber batt 16 are concurrently manufactured, thereby allowing the lamination and attachment per 82, 84, 86, and 88 of method 70, which are performed by a lamination apparatus 200, to occur generally continuously without the need to stop the lamination apparatus 200 to add or manufacture additional quantities of the first fiber batt 12 and the second fiber batt 16.

Figure 7:
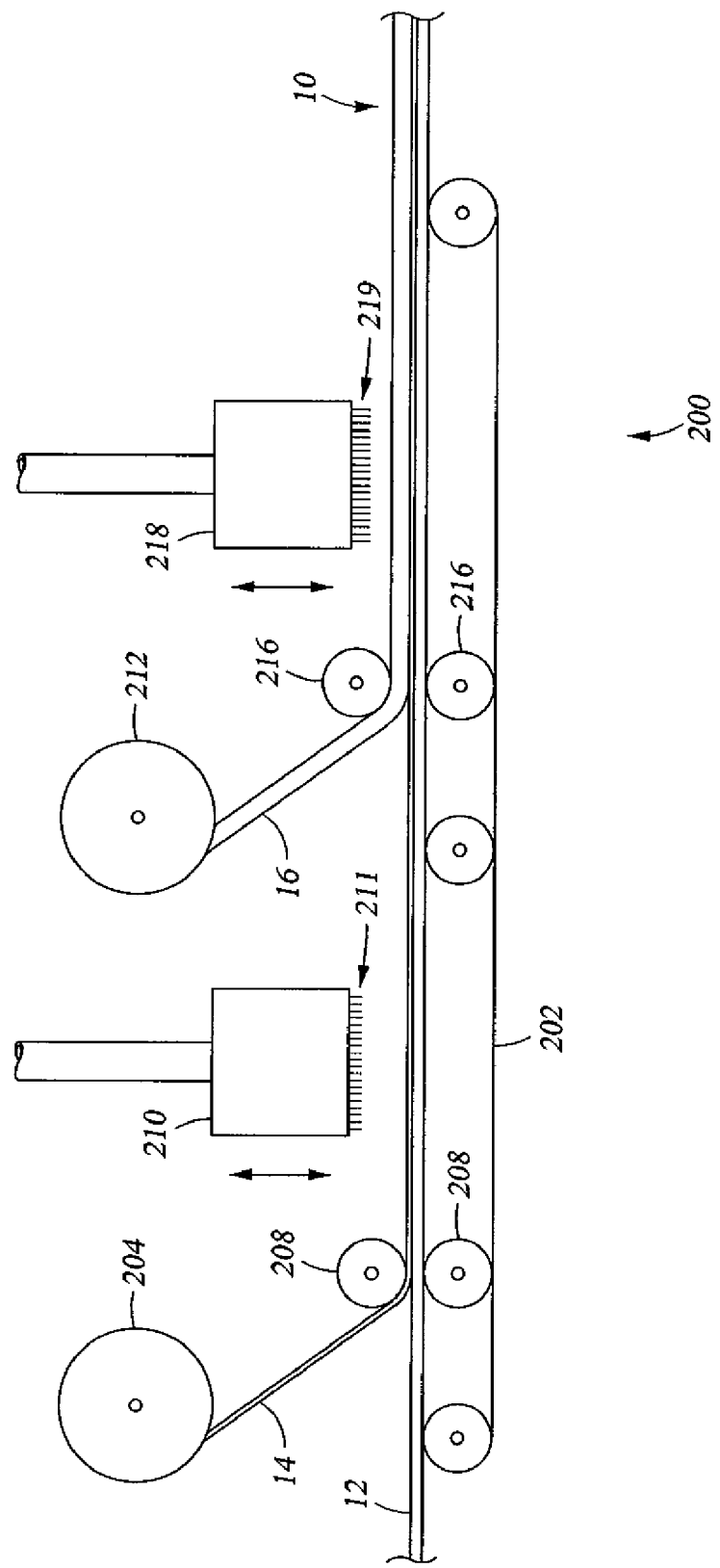
FIG. 7 is a side view of an embodiment of a laminating apparatus used in forming the Fiber Batt Having a Separator Layer in accordance with the method of FIG. 4.

As seen in FIGS. 5 and 7, the lamination apparatus 200 laminates the separator layer 14 onto the first fiber batt 12 per 82 of method 70, attaches the separator layer 14 to the first fiber batt 12 per 84 of method 70, laminates the second fiber batt 16 onto the separator layer 14 per 86 of method 70, and attaches the second fiber batt 16 to the separator layer 14 per 88 of method 70. The lamination apparatus 200 attaches the first fiber batt 12 to the separator layer 14 and the second fiber batt 16 to the separator layer 14 in such a matter that the attachment strength between the first fiber batt 12 and the separator layer 14 is greater than the attachment strength between the second fiber batt 16 and the separator layer 14. The variation in attachment strength facilitates consistent separation of the second fiber batt 16 from the separator layer 14 and the first fiber batt 12. Of course, persons of ordinary skill in the art will appreciate that lamination apparatus 200 can be configured such that the attachment strength between the first fiber batt 12 and the separator layer 14 may be less than the attachment strength between the second fiber batt 16 and the separator layer 14. Such a configuration allows the first fiber batt 12 to separate from the second fiber batt 16 and the separator layer 14 and is within the scope of the invention.

As seen in FIG. 7, the first fiber batt 12 travels along conveyor 202 from the left to the right. The separator layer 14 is fed from a separator layer feed roll 204 and laminated onto the first fiber batt 12 using guide rollers 208, per 82 of method 70. As previously mentioned, the separator layer 14 is preferably a nonwoven fiber scrim. In some applications, is may be advantageous for guide rollers 208 to be nip rollers, as the term is generally understood in the art. The separator layer 14 is then attached to the first fiber batt 12 by a needle punch loom 210, per 84 of method 70. The needle punch loom 210 contains a plurality of needles 211, each of which contains a plurality of downwardly facing barbs. The barbs allow the needles 211 to entangle the fibers in the separator layer 14 with the fibers in the first fiber batt 12.

The second fiber batt 16 is then fed from a second fiber batt feed roll 212 and laminated onto the separator layer 14 using guide rollers 216, per 86 of method 70. If the first and second processing lines 110 are configured such that the first fiber batt 12 and the second fiber batt 16 are concurrently produced in a continuous process, the second fiber batt feed roll 212 is replaced with guide rolls that feed the second fiber batt 16 to the guide rolls 216. In some applications, is may be advantageous for guide rollers 216 to be nip rollers, as the term is generally understood in the art. The second fiber batt 16 is then attached to the separator layer 14 by a needle punch loom 218, per 88 of method 70. The needle punch loom 218 is similar to the needle punch loom 210 in that it contains a plurality of needles 219, each of which contains a plurality of downwardly facing barbs. The barbs allow the needles 219 to entangle the fibers in the second fiber batt 16 with the fibers in the separator layer 14. In order to penetrate the second fiber batt 16 and entangle the fibers of the second fiber batt 16 with the fibers in the separator layer 14, the needles 219 may be a different size and length and contain different barbs than needles 211. When the second fiber batt 16 is attached to the separator layer 14, the resultant three layer product comprising the first fiber batt 12, the separator layer 14, and the second fiber batt 16 forms the Fiber Batt Having a Separator Layer 10.

After the Fiber Batt Having a Separator Layer 10 exits the lamination apparatus 200, it moves into a cutting zone 180 (shown in FIG. 5) where the lateral edges of the batt are trimmed per 90 to a finished width. The Fiber Batt Having a Separator Layer 10 is then cut transversely to a desired length and sent to a furniture manufacturer or other end user.

In an alternative embodiment, the Fiber Batt Having a Separator Layer 10 may be produced by inserting the lamination apparatus 200 between two sets of the cross-lappers 116', 117', 118' such that one fiber web is formed below the separator layer 14 and one fiber web is formed above the separator layer 14 prior to heating and compressing the fiber webs to form the batts. In this embodiment, the separator layer 14 is between the two nonwoven fiber webs as the webs are formed, and the combination of the webs and the separator layer 14 is thermally bonded as described above. The resulting Fiber Batt Having a Separator Layer 10 has the separator layer 14 embedded between the first fiber batt 12 and the second fiber batt 16. The variation in attachment to the separator layer 14 between the first fiber batt 12 and the second fiber batt 16 can be achieved by varying the amount of binder fiber in the web above and below the separator layer 14 or by needle punching one side of the Fiber Batt Having a Separator Layer 10, or by other methods not specifically described herein. This embodiment eliminates the need to separately form the first fiber batt 12 and the second fiber batt 16, either concurrently or in subsequent processes, and allows the Fiber Batt Having a Separator Layer 10 to be continuously produced on a single general processing line 110.

It is contemplated that other bonding methods, such as mechanical bonding and resin bonding, may be used to bond the batt together in lieu of the thermal bonding method described herein. Mechanical bonding is the process of bonding the nonwoven batt together without the use of resins, binder fibers, adhesives, or heat. Examples of mechanical bonding methods are needle punching and hydro entanglement. Needle punching is the aforementioned process of entangling the fibers in the web together using barbed needles. Hydro entanglement uses streams of high pressure water to entangle the fibers of the nonwoven web. The Fiber Batt Having a Separator Layer 10 includes nonwoven production methods other than the nonwoven production methods described herein and should not be limited to the nonwoven production methods described herein.

The Fiber Batt Having a Separator Layer 10 described herein is suitable for a variety of applications, particularly those applications requiring two or more batts of different thicknesses in different portions thereof. It should be noted, however, that those applications of the Fiber Batt Having a Separator Layer 10 which use more than two layers would required different attachment strengths to ensure that the fiber batts detach from one another in the desired order. The Fiber Batt Having a Separator Layer 10 would also be useful in applications traditionally characterized by the attachment of two or more fiber batts in either contiguous or noncontiguous portions thereof. Of course, in noncontiguous portions thereof, the primary benefit would be to eliminate the need for supplying the manufacturer or installer with two separate fiber batts. In other words, the Fiber Batt Having a Separator Layer 10 allows an installer to utilize a single nonwoven fiber product to provide various layers of cushioning to an article of furniture, whereas previously multiple nonwoven fiber products were required.

In addition to aforementioned applications, the Fiber Batt Having a Separator Layer 10 may be used as a cushioning material in various articles without separating the Fiber Batt Having a Separator Layer 10 into two or more nonwoven fiber products. Such a use would be advantageous over traditional nonwoven fiber products because the Fiber Batt Having a Separator Layer 10 has a greater strength due to the inclusion of the separator layer 14 therein. Regardless of the application, the Fiber Batt Having a Separator Layer 10 may be used for any type of article of furniture, including chairs, sofas, loveseats, ottomans, beds, and so forth. Moreover, the Fiber Batt Having a Separator Layer 10 may be used for automobile, airplane, or other vehicle upholstery. The Fiber Batt Having a Separator Layer 10 may also be used in quilts, pillows, comforters, beddings, and other household articles. The Fiber Batt Having a Separator Layer 10 includes other applications not specifically listed, and the scope of the invention should not be restricted to the aforementioned applications.

While a number of preferred embodiments of the invention have been shown and described herein, modifications thereof may be made by one skilled in the art without departing from the spirit and the teachings of the invention. The embodiments described herein are exemplary only and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

The invention claimed is:

1. A method for manufacturing an article of furniture, the method comprising:
constructing a frame comprising a first area and a second area, the first area requiring a different thickness of cushioning material than the second area;
attaching a nonwoven fiber product to the frame, the nonwoven fiber product comprising:
a first nonwoven fiber batt;
a second nonwoven fiber batt; and
a separator layer attached to each of the first fiber batt and the second fiber batt, the separator layer physically separating the first fiber batt and the second fiber batt; and
separating the fiber product into a first portion comprised of the first fiber batt and the separator layer, and a second portion comprised of the second fiber batt.

2. The method of claim 1 further comprising:
attaching the first portion to the first area;
separating the second portion from the first portion; and
attaching the second portion to the second area.

3. The method of claim 2 wherein the second portion is separated from the first portion without detaching the first portion from the first area.

4. The method of claim 3 wherein the first fiber batt and the second fiber batt are high-loft nonwoven fiber batts.

5. The method of claim 4 wherein the first fiber batt is attached to the separator layer with a first strength and the separator layer is attached to the second fiber batt with a second strength, the second strength being less than the first strength so that the second fiber batt consistently separates from the first fiber batt and the separator layer.

6. A method for upholstering an article of furniture having a frame, the method comprising:
attaching a nonwoven fiber product to the frame, the nonwoven fiber product comprising:
a first nonwoven fiber batt;
a second nonwoven fiber batt; and
a separator layer attached to each of the first fiber batt and the second fiber batt, the separator layer physically separating the first fiber batt and the second fiber batt; and
separating the fiber product into a first portion and a second portion being thicker than the first portion.

7. The method of claim 6, wherein the frame comprises a first area and a second area, the first area requiring a different thickness of cushioning than the second area, and the method further comprising:
securely attaching the first portion to the first area;
separating the second portion from the first portion; and
securely attaching the second portion to the second area.

8. The method of claim 7 wherein the second portion is separated from the first portion without detaching the first portion from the first area.

9. The method of claim 8 further comprised of attaching the first fiber batt to the separator layer with a first strength and attaching the separator layer to the second fiber batt with a second strength, the second strength being less than the first strength so that the second fiber batt consistently separates from the first fiber batt and the separator layer.

10. The method of claim 1 wherein the first fiber batt has a different thickness than the second fiber batt.

11. The method of claim 10 wherein the separator layer increases the puncture resistance of the first fiber batt.

12. The method of claim 10 further comprising upholstering the cushioned frame with fabric.

13. A method for applying cushioning to a frame comprising:
securely attaching a nonwoven fiber cushioning product to the frame;
wherein the nonwoven fiber cushioning product comprises:
a first nonwoven fiber batt;
a second nonwoven fiber batt; and
a separator layer located between and attached to each of the first fiber batt and the second fiber batt;
wherein:
the separator layer physically separates the first fiber batt and the second fiber batt;
the first fiber batt is thinner than the second fiber batt; and the separator layer is attached less strongly to the second fiber batt than to the first fiber batt so that the second fiber batt is operable to consistently separate from the first fiber batt and the separator layer.

14. The method of claim 13 wherein if thin cushioning is desired for a portion of the frame, the first fiber batt is attached to the frame, and the second fiber batt is separated from the first fiber batt and the separator layer such that the separator layer forms the exterior of the cushioning.

15. The method of claim 13 wherein if thick cushioning is desired for a portion of the frame, the second fiber batt is not separated from the first fiber batt and the separator layer.

16. The method of claim 13 wherein if thick cushioning is desired for a portion of the frame, the second fiber batt is attached to the frame, and the first fiber batt and separator layer are jointly separated from the second fiber batt.

17. The method of claim 13 further comprising separating the nonwoven fiber cushioning product into a first portion comprised of the first fiber batt and the separator layer and a second portion comprised of the second fiber batt; wherein:
- the frame comprises a first area and a second area, the first area requiring a different thickness of cushioning material than the second area;
- after separation, the first portion and the second portion remain connected along an edge; and
- the first portion is attached to provide cushioning for the first area, the second portion is attached to provide cushioning for the second area, and the connected edge substantially eliminates sharp discontinuities in cushioning between the first area and the second area.

* * * * *